United States Patent
Kida et al.

(10) Patent No.: US 9,622,140 B2
(45) Date of Patent: Apr. 11, 2017

(54) BASE STATION AND HANDOVER CONTROL METHOD

(71) Applicant: FUJITSU LIMITED, Kawasaki-shi, Kanagawa (JP)

(72) Inventors: Hiroyuki Kida, Sagamihara (JP); Kenichi Nunokawa, Kawasaki (JP); Shoichiro Ebesu, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 196 days.

(21) Appl. No.: 14/059,764

(22) Filed: Oct. 22, 2013

(65) Prior Publication Data

US 2014/0155073 A1    Jun. 5, 2014

(30) Foreign Application Priority Data

Dec. 5, 2012    (JP) ................................ 2012-266751

(51) Int. Cl.
 *H04W 36/32*    (2009.01)

(52) U.S. Cl.
 CPC .................................. *H04W 36/32* (2013.01)

(58) Field of Classification Search
 CPC ............ H04W 36/00–36/385; H04W 40/026; H04W 48/04; H04W 52/28; H04W 52/282; H04W 64/006; H04W 24/10; H04W 28/0278; H04W 52/365
 See application file for complete search history.

(56) References Cited

U.S. PATENT DOCUMENTS

| | | | | |
|---|---|---|---|---|
| 2007/0081468 A1* | 4/2007 | Timus | ................... | H04W 24/00 370/252 |
| 2009/0271621 A1* | 10/2009 | Mendelovich | ...... | H04L 63/0428 713/168 |
| 2010/0234047 A1* | 9/2010 | Lipovski | ............. | H04M 19/044 455/456.4 |
| 2010/0267378 A1* | 10/2010 | Hamabe | ................ | H04W 24/10 455/423 |
| 2011/0080825 A1* | 4/2011 | Dimou | ................. | H04J 11/0086 370/216 |
| 2011/0320588 A1* | 12/2011 | Raleigh | ............... | H04W 36/245 709/224 |
| 2012/0094672 A1 | 4/2012 | Hunukumbure | | |
| 2012/0100851 A1* | 4/2012 | Zheng | ............... | H04W 36/0094 455/436 |
| 2013/0064226 A1* | 3/2013 | Dinan | ................... | H04W 36/30 370/332 |

(Continued)

FOREIGN PATENT DOCUMENTS

| | | |
|---|---|---|
| JP | 2011-166274 | 8/2011 |
| JP | 2012-090267 | 5/2012 |

*Primary Examiner* — Mehmood B Khan
(74) *Attorney, Agent, or Firm* — Staas & Halsey LLP

(57) ABSTRACT

A base station performs communication with a terminal by using a cell defined as a combination of a frequency and an area reachable by a signal transmitted from the base station. The base station specifies, for each of cells, a first area in which disconnection of communication with a terminal occurs more frequently as compared to another area. The base station controls handover that changes a current cell of a first terminal to another cell, based on information on the specified first area and the current cell of the first terminal, and a position, moving speed, and moving direction of the first terminal.

7 Claims, 11 Drawing Sheets

| CELL ID | meshcode | COUNT VALUE |
|---|---|---|
| 1 | A | 3 |
| 1 | B | 10 |
| 2 | B | 13 |
| ⋮ | ⋮ | ⋮ |
| 5 | S | 8 |
| 6 | R | 9 |
| 6 | Q | 1 |

(56) References Cited

U.S. PATENT DOCUMENTS

| | | | |
|---|---|---|---|
| 2013/0172018 A1* | 7/2013 | Correale | H04M 1/72577 |
| | | | 455/456.4 |
| 2013/0303081 A1* | 11/2013 | Chang | H04W 36/0061 |
| | | | 455/11.1 |
| 2014/0057634 A1* | 2/2014 | Chang | H04W 36/32 |
| | | | 455/437 |
| 2014/0213264 A1* | 7/2014 | Park | H04W 36/0055 |
| | | | 455/438 |
| 2014/0335855 A1* | 11/2014 | Lee | H04W 24/10 |
| | | | 455/426.1 |

* cited by examiner

FIG. 2

| CELL ID | meshcode | COUNT VALUE |
|---|---|---|
| 1 | A | 3 |
| 1 | B | 10 |
| 2 | B | 13 |
| ⋮ | ⋮ | ⋮ |
| 5 | S | 8 |
| 6 | R | 9 |
| 6 | Q | 1 |

FIG. 3

| CELL ID | group ID | meshcode 1 | meshcode 2 |
|---|---|---|---|
| 1 | 1 | B | F |
| 2 | 1 | M | R |
| 2 | 2 | N | N |
| ⋮ | ⋮ | ⋮ | ⋮ |

| OWN STATION | | ANOTHER STATION 1 | | ANOTHER STATION 2 | | ANOTHER STATION 3 | |
|---|---|---|---|---|---|---|---|
| CELL ID | group ID | CELL ID 1 | CELL ID 2 | CELL ID 1 | CELL ID 2 | CELL ID 1 | CELL ID 2 |
| 1 | 1 | 7 | 8 | 9 | 10 | – | – |
| 1 | 2 | 13 | – | – | – | 18 | – |
| 2 | 1 | – | – | 14 | 12 | 16 | – |
| 2 | 2 | 8 | – | – | – | – | – |
| 2 | 3 | – | – | 19 | – | – | – |
| ⋮ | ⋮ | ⋮ | ⋮ | ⋮ | ⋮ | ⋮ | ⋮ |
| 6 | 1 | 21 | – | – | – | – | – |
| 6 | 2 | – | – | – | – | 30 | – |
| 6 | 3 | – | – | 19 | – | – | – |

FIG. 7

UEInformationResponse
└RLF-Report
    ├ previous PCell Id  (ID OF CELL IN WHICH RLF HAS OCCURRED)
    └ locationInfo  (INFORMATION MEASURED LAST BEFORE RLF HAS OCCURRED
        ├ time  (TIME)
        ├ latitude  (LATITUDE)
        ├ longitude  (LONGITUDE)
        ├ altitude  (ALTITUDE)
        ├ bearing  (BEARING)
        └ speed  (SPEED)

FIG. 8

| 0 | 0 | 0 | 0 | 0 | 0 | 0 | 0 | 0 | 0 | 0 | 1 | 0 | 0 | 0 | 0 | 0 |
|---|---|---|---|---|---|---|---|---|---|---|---|---|---|---|---|---|
| 0 | 0 | 0 | 1 | 0 | 11 | 0 | 0 | 0 | 0 | 0 | 0 | 0 | 0 | 0 | 0 | 0 |
| 1 | 0 | 0 | 0 | 0 | 0 | 0 | 0 | 0 | 9 | 0 | 0 | 0 | 0 | 0 | 2 | 0 |
| 0 | 0 | 0 | 0 | 0 | 0 | 0 | 0 | 0 | 0 | 0 | 15 | 12 | 11 | 15 | 0 | 0 |
| 0 | 0 | 2 | 13 | 0 | 0 | 0 | 1 | 0 | 0 | 0 | 13 | 8 | 6 | 14 | 0 | 0 |
| 0 | 0 | 1 | 13 | 0 | 0 | 0 | 0 | 8 | 0 | 0 | 12 | 4 | 5 | 16 | 0 | 1 |
| 0 | 0 | 0 | 0 | 0 | 0 | 0 | 0 | 0 | 0 | 0 | 13 | 15 | 13 | 7 | 0 | 0 |
| 0 | 0 | 0 | 0 | 0 | 0 | 10 | 11 | 0 | 0 | 0 | 0 | 0 | 0 | 0 | 0 | 0 |
| 0 | 0 | 0 | 0 | 0 | 0 | 13 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 1 | 0 | 0 | 0 | 0 | 0 | 0 | 0 |

FIG. 11

| 54360196247 | 54360196248 | 54360196249 | 54360197140 | 54360197141 |
|---|---|---|---|---|
| 54360196237 | 54360196238 | 54360196239 | 54360197130 | 54360197131 |
| 54360196227 | 54360196228 | 54360196229 | 54360197120 | 54360197121 |
| 54360196217 | 54360196218 | 54360196219 | 54360197110 | 54360197111 |
| 54360196207 | 54360196208 | 54360196209 | 54360197100 | 54360197101 |
| 54360186497 | 54360186498 | 54360186499 | 54360187390 | 54360187391 |
| 54360186487 | 54360186488 | 54360186489 | 54360187380 | 54360187381 |
| 54360186477 | 54360186478 | 54360186479 | 54360187370 | 54360187371 |
| 54360186467 | 54360186468 | 54360186469 | 54360187360 | 54360187361 |
| 54360186457 | 54360186458 | 54360186459 | 54360187350 | 54360187351 |

P101 points to 54360196238. A201 indicates the hatched region.

FIG. 12

| MESH UNIT | 80 km | 80 km | 10 km | 10 km | 1 km | 1 km | 500 m | 50 m | 50 m |
|---|---|---|---|---|---|---|---|---|---|
| MESH CODE LABEL | AA | aa | B | b | C | c | D | E | e |
| TERMINAL | 54 | 36 | 0 | 1 | 9 | 6 | 2 | 3 | 8 |
| RLF FREQUENT OCCURRENCE GROUP (UPPER RIGHT) | 54 | 36 | 0 | 1 | 8 | 7 | 3 | 8 | 1 |
| DIFFERENCE | (0, 0) | (0, 0) | (0, 0) | (0, 0) | (0, −1) | (+1, 0) | (−1, +1) | (0, +5) | (−7, 0) |

FIG. 13

| group ID | mesh 1 (NORTHWEST) | | mesh 2 (NORTHEAST) | | mesh 3 (SOUTHWEST) | | mesh 4 (SOUTHEAST) | |
|---|---|---|---|---|---|---|---|---|
| | POSITIONAL RELATIONSHIP | DISTANCE BEARING | POSITIONAL RELATIONSHIP | DISTANCE BEARING | POSITIONAL RELATIONSHIP | DISTANCE BEARING | POSITIONAL RELATIONSHIP | DISTANCE BEARING |
| 1 | (1, 5) | 5.1  168.7 | (3, 5) | 5.8  149 | (1, 7) | 7.1  171.9 | (3, 7) | 7.6  156.8 |
| 2 | ... | ...  ... | ... | ...  ... | ... | ...  ... | ... | ...  ... |
| 3 | ... | ...  ... | ... | ...  ... | ... | ...  ... | ... | ...  ... |
| ... | | | | | | | | |

BASE STATION AND HANDOVER CONTROL METHOD

CROSS-REFERENCE TO RELATED APPLICATION

This application is based upon and claims the benefit of priority of the prior Japanese Patent Application No. 2012-266751, filed on Dec. 5, 2012, the entire contents of which are incorporated herein by reference.

FIELD

The embodiments discussed herein are related to a base station and a handover control method.

BACKGROUND

In a communication system, a terminal connects with one of cells to perform communication. The "cell" is determined by an area covered by each base station, that is, a area reached by a signal transmitted from each base station, or one of divided areas (that is, so-called sectors) into which the area is divided, and a frequency. Each cell has a unique cell identification information (that is, a cell ID) associated thereto. The terminal is given the identification information of a cell with which the terminal connects.

When the reception power of a signal transmitted reduces in the cell with which the terminal connects, due to move of the terminal, normally, handover to a cell in which the reception power is higher is executed. However, if the terminal enters a "coverage hole", there might be cases where communication between the terminal and the cell with which the terminal connects is disconnected before handover is executed. The "coverage hole" means an area which a radio wave from a base station does not reach at all, or an area where the reception power rapidly falls, as compared to the surrounding areas. Disconnection of communication caused by such a rapid fall of the reception power is sometimes called radio link failure (RLF).

When an RLF occurs, the terminal or the base station remains in a state where setting information and the like for a service performed immediately before the occurrence of the RLF is maintained, that is, a RRC connection state where connection is maintained using the radio resource control (RRC). When the radio wave condition is not improved for a predetermined period of time after the detection of an RLF, the state of the terminal and the base station transitions to an idle state. The idle state means a state where the terminal waits for the generation of new data or a call from the base station, and no data exchange takes place. In the idle state, unlike the RRC connection state, setting information and the like for a service previously performed is not maintained.

After the transition to the idle state, the terminal gives a "request for reconnection" to the base station. That is, a reconnection sequence is executed. Thus, the terminal is enabled to continue communication with the base station using a cell which has been reconnected.

In the Third Generation Partnership Project (3GPP) as an international standardization organization, LTE-Advanced (Release 10) which has largely extended functions has been already developed. When a LTE-Advanced compatible terminal detects an RLF, the terminal generates a report (an RLF-Report) including identification information of a cell with which the terminal currently connects and the positional information of the terminal itself and holds it. Then, when the terminal receives, after reconnecting with a cell, a terminal information request (a UE information Request) transmitted from the base station, the terminal transmits, to the base station, a terminal information response (UE information Response) including the RLF-Report held by the terminal, in response to the terminal information request. Then, when a base station of a cell with which the terminal connects is different between before and after reconnection, the base station of the cell after reconnection notifies the base station of the cell before reconnection, that is, the cell where the RLF occurred, of the RLF-Report using RLF INDICATION.

Japanese Laid-open Patent Publication No. 2012-90267 describes the related technique.

SUMMARY

According to an aspect of the invention, a base station performs communication with a terminal by using a cell defined as a combination of a frequency and an area reachable by a signal transmitted from the base station. The base station specifies, for each of cells, a first area in which disconnection of communication with a terminal occurs more frequently as compared to another area. The base station controls handover that changes a current cell of a first terminal to another cell, based on information on the specified first area and the current cell of the first terminal, and a position, moving speed, and moving direction of the first terminal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of a count management table, according to a first embodiment;

FIG. 3 is a diagram illustrating an example of a frequent occurrence area table, according to a first embodiment;

FIG. 7 is a diagram illustrating an example of a terminal information response, according to an embodiment;

FIG. 8 is a schematic diagram illustrating an example of processing for specifying a frequent occurrence area, according to an embodiment;

FIG. 11 is a diagram illustrating an example of a method for calculating a positional relationship between a target terminal and a frequent occurrence area, according to an embodiment;

FIG. 12 is a diagram illustrating an example of a method for calculating a positional relationship between a target terminal and a frequent occurrence area, according to an embodiment;

FIG. 13 is a diagram illustrating an example of a method for calculating a positional relationship between a target terminal and a frequent occurrence area, according to an embodiment;

DESCRIPTION OF EMBODIMENTS

Figure 1:
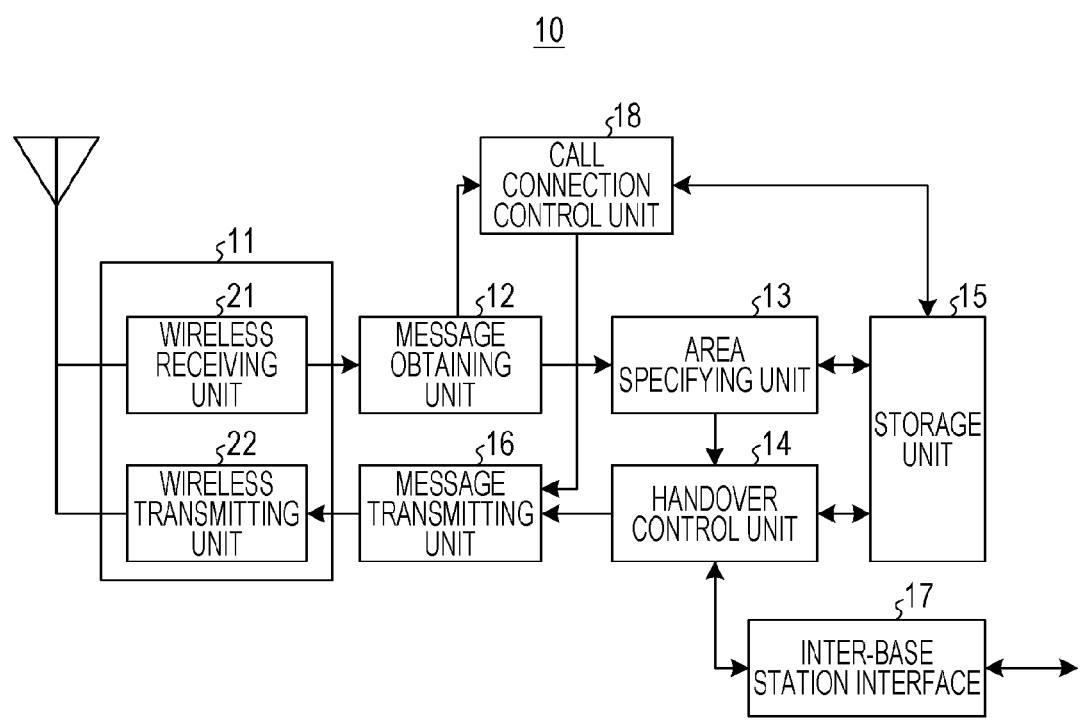
FIG. 1 is a diagram illustrating an example of a configuration of a base station, according to a first embodiment.

However, although the terminal reconnects with a cell to continue communication, the terminal is unable to perform communication while a reconnection sequence or the like is being performed. Since a period in which communication is disconnected continues in a unit of several seconds, a user feels that disconnection of communication lasts long. That is, usability for the user is deteriorated.

Moreover, the execution of a reconnection sequence increases the signaling amount between a terminal and a base station or between one base station and another base station.

Embodiments of a base station and a handover control method disclosed in the present application will be hereinafter described in detail on the basis of the accompanying drawings. Note that there is no intention to limit the disclosure to the following embodiments. In the following embodiments, components having the same function will be identified by the same reference character, and the redundant description will be omitted.

First Embodiment

Configuration of Base Station

FIG. 1 is a diagram illustrating an example of a configuration of a base station, according to a first embodiment. In FIG. 1, a base station 10 includes a communication unit 11, a message obtaining unit 12, an area specifying unit 13, a handover control unit 14, a storage unit 15, a message transmitting unit 16, an inter-base station interface 17, and a call connection control unit 18.

The communication unit 11 performs communication with a terminal serving as a communication partner by using a cell allocated to the terminal. As described above, a cell is defined as a combination of a frequency and a divided area that is obtained by dividing an area reachable by a signal transmitted from the base station 10.

The communication unit 11 includes a wireless receiving unit 21 and a wireless transmitting unit 22. The wireless receiving unit 21 receives a signal transmitted from a terminal 50, which will be described later, via an antenna, and performs predetermined wireless receiving processing, that is, down convert, analog-to-digital conversion, and the like, on a reception signal. The wireless transmitting unit 22 performs predetermined wireless transmitting processing, that is, digital-to-analog conversion, up convert, and the like, on an input signal and transmits the processed input signal via the antenna.

The message obtaining unit 12 extracts various messages transmitted from the terminal 50 from the reception signals received from the communication unit 11, and outputs the messages to the area specifying unit 13 and the call connection control unit 18. Various messages to be extracted include a first report (for example, the above-described RLF-Report) which is transmitted from the terminal 50 each time disconnection of communication occurs and includes the positional information, moving speed, and moving direction of the terminal 50 at the time of the occurrence of disconnection of communication. Also, the various messages to be extracted include a second report (for example, MeasurementReport) which includes the position, moving speed, and moving direction of each terminal 50 and is cyclically transmitted.

The area specifying unit 13 specifies a "frequent occurrence area" where disconnection of communication with the terminal 50 occurs more frequently than in other areas. The area specifying unit 13 specifies a frequent occurrence area for each frequency. That is, the area specifying unit 13 specifies a frequent occurrence area for each cell.

For example, the area specifying unit 13 counts, on the basis of the first report obtained by the message obtaining unit 12, the number of times of occurrence of disconnection of communication (the count value) for each mesh code, and sets, as the frequent occurrence area, an area corresponding to a mesh code for which the count value is equal to or more than a threshold.

The area specifying unit 13 groups a plurality of mesh codes for which the count value is equal to or greater than the threshold and whose corresponding areas form a continuous area, into the same group. Then, the area specifying unit 13 sets, as the frequent occurrence area, a rectangular area including all of areas corresponding to mesh codes included in the same group.

The area specifying unit 13 manages a "count management table" stored in the storage unit 15 and specifies the frequent occurrence area using the count management table. In the count management table, a plurality of cell IDs, a plurality of mesh codes corresponding to the cell IDs, the number of times the first report including the positional information corresponding to each mesh code has been obtained (the count value) are stored in association with one another. FIG. 2 is a diagram illustrating an example of a count management table, according to a first embodiment.

The area specifying unit 13 causes a "frequent occurrence area table" to hold the rectangular area which is the frequent occurrence area and includes all of areas corresponding to mesh codes included in the same group. In the frequent occurrence area table, the identification information (that is, a group ID) of the frequent occurrence area, the boundary information defining a boundary of the frequent occurrence area, and the cell ID corresponding to the frequent occurrence area are stored in association with one another. FIG. 3 is a diagram illustrating an example of a frequent occurrence area table, according to a first embodiment. In the frequent occurrence area table illustrated in FIG. 3, as the boundary information, the mesh codes corresponding to two opposing apexes of four apexes of the rectangular area are held.

The handover control unit 14 controls, on the basis of the frequent occurrence area specified by the area specifying unit 13, the current cell of the target terminal 50, the position, moving speed, and moving direction of the target terminal 50, handover for changing the current cell of the target terminal 50 to another cell.

Figures 4, 5:
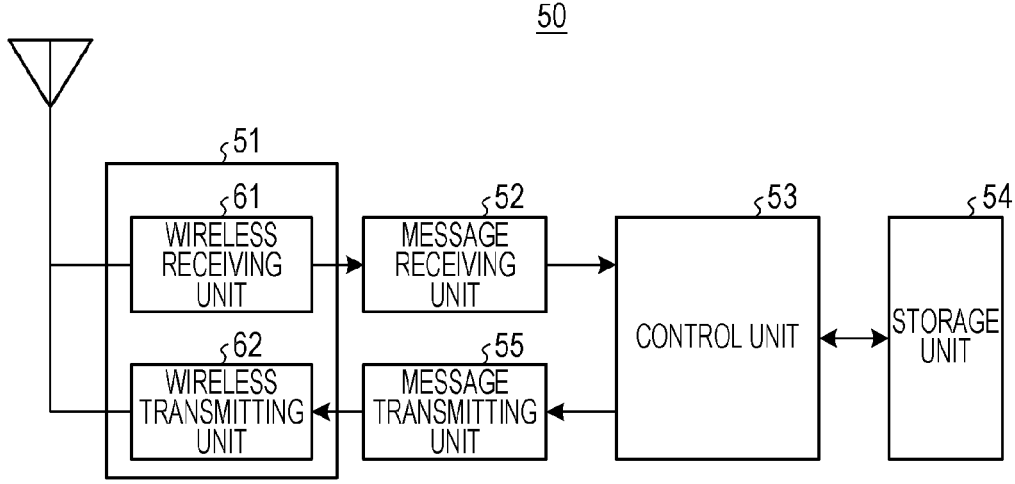
FIG. 4 is a diagram illustrating an example of a management table, according to a first embodiment.
FIG. 5 is a diagram illustrating an example of a configuration of a terminal, according to a first embodiment.

Specifically, the handover control unit 14 determines whether or not the target terminal 50 enters, among the frequent occurrence areas specified by the area specifying unit 13, a target frequent occurrence area whose frequency is the same as that of the current cell of the target terminal, on the basis of the position and moving direction of the target terminal 50. The handover control unit 14 calculates, on the basis of the target frequent occurrence area and the position and moving speed of the target terminal 50, time needed for the target terminal 50 to enter the target frequent occurrence area. Then, when it is determined that the target terminal 50 enters the target frequent occurrence area and the calculated time is less than a threshold, the handover control unit 14 forcibly causes handover of the target terminal 50. Specifically, the handover control unit 14 forcibly causes handover of the target terminal 50 to a cell which includes neither frequent occurrence areas of the own base station 10 to which the handover control unit 14 belongs nor frequent occurrence areas of an adjacent base station 10. The handover control unit 14 may manage a "management table" in which a cell of the adjacent base station 10, which includes the frequent occurrence area of the own base station 10, is stored, and may specify a cell which includes neither the frequent occurrence areas of the own base station 10 nor the frequent occurrence areas of the adjacent base station 10, by using the management table. The management table is stored in the storage unit 15. FIG. 4 is a diagram illustrating an example of a management table, according to a first embodiment. The forcibly caused handover means handover executed to the terminal 50 which is determined to enter the frequent occurrence area in near future, even when reception power is still not low in communication using a cell which is currently connected.

Then, the handover control unit 14 transmits information on the cell of a handover destination to the terminal 50 of a control target, via the message transmitting unit 16. When the cell of a handover destination is not a cell of the base station of the handover control unit 14 but a cell of the adjacent base station 10, the handover control unit 14 transmits information on the terminal 50 of a control target and the handover destination cell, to the adjacent base station 10, via the inter-base station interface 17.

The handover control unit 14 sets a cycle with which each terminal 50 transmits the second report. For example, the handover control unit 14 sets the cycle of transmission of the second report performed by the terminal 50 connected to the cell including the frequent occurrence area of the own base station 10 to which the handover control unit 14 belongs, at a value shorter than the cycle of transmission of the second report transmitted by the terminal 50 which is not connected to the cell including the frequent occurrence area of the own base station 10.

The message transmitting unit 16 forms a message, by using information received from the handover control unit 14 or the call connection control unit 18, and transmits the message via the communication unit 11 and the antenna.

The inter-base station interface 17 transmits and receives a signal to and from the adjoining base station 10. For example, the inter-base station interface 17 transmits the information on the terminal 50 of a control target and the cell of a handover destination, received from the handover control unit 14, to the adjacent base station 10. The inter-base station interface 17 transmits the information on frequent occurrence areas of the own base station 10 to which the handover control unit 14 belongs and the cell ID corresponding to the frequent occurrence areas, received from the handover control unit 14, to the adjacent base station 10. Also, the inter-base station interface 17 receives information on frequent occurrence areas of the adjacent base station 10 and the cell ID corresponding to the frequent occurrence areas, transmitted from the adjacent base station 10, and outputs the information to the handover control unit 14. Thus, two adjacent base stations hold information on the frequent occurrence areas and the cell IDs corresponding to the frequent occurrence areas of each other, thereby enabling handover to a cell which does not include any one of their frequent occurrence areas.

The call connection control unit 18 transmits and receives various messages to and from the terminal 50 in a connection sequence and forms a wireless link with the terminal 50. Messages are transmitted and received via the message obtaining unit 12 and the message transmitting unit 16. Information on the formed wireless link is stored in the storage unit 15.

Configuration of Terminal

FIG. 5 is a diagram illustrating an example of a configuration of a terminal, according to a first embodiment. In FIG. 5, the terminal 50 includes a communication unit 51, a message receiving unit 52, a control unit 53, a storage unit 54, and a message transmitting unit 55.

The communication unit 51 performs communication with the base station 10 by using a cell allocated from the base station 10.

The communication unit 51 includes a wireless receiving unit 61 and a wireless transmitting unit 62. The wireless receiving unit 61 receives a signal transmitted by the base station 10 via the antenna and performs predetermined wireless receiving processing, that is, down convert, analog-to-digital conversion, and the like, on the received signal. The wireless transmitting unit 62 performs predetermined wireless transmitting processing, that is, digital-to-analog conversion, up convert, and the like, on the input signal and transmits the processed input signal via the antenna.

The message receiving unit 52 extracts, from the signals received from the communication unit 51, various messages transmitted from the base station 10 and outputs the extracted messages to the control unit 53. The various messages to be extracted include a setting message including information on a transmission cycle of the second report, a handover control message including information on a handover destination cell, and the like.

The control unit 53 transmits and receives various messages to and from the base station 10 in a connection sequence and establishes a wireless link with the base station 10. Messages are transmitted and received via the message receiving unit 52 and the message transmitting unit 55. Information on the established wireless link is stored in a storage unit 54.

When communication in the connected cell is disconnected, the control unit 53 causes the message transmitting unit 55 to form a first report (for example, the above-described RLF-Report) including the positional information, moving speed, and moving direction of the own terminal to which the control unit 53 belongs, at the time of disconnection of communication, and transmits the first report to the base station 10.

The control unit 53 also causes the message transmitting unit 55 to form a second report (for example, MeasurementReport) including the position, moving speed, and moving direction of the own terminal to which the control unit 53 belongs, with the transmission cycle set by the setting message, and transmits the second report to the base station 10.

The message transmitting unit 55 forms a message by using information received from the control unit 53 and transmits the message via the communication unit 51 and the antenna.

Operation of Base Station and Terminal

The operation of the base station 10 and the terminal 50 each having the above-described configuration will be described.

Specific Processing for Frequent Occurrence Area

Figure 6:
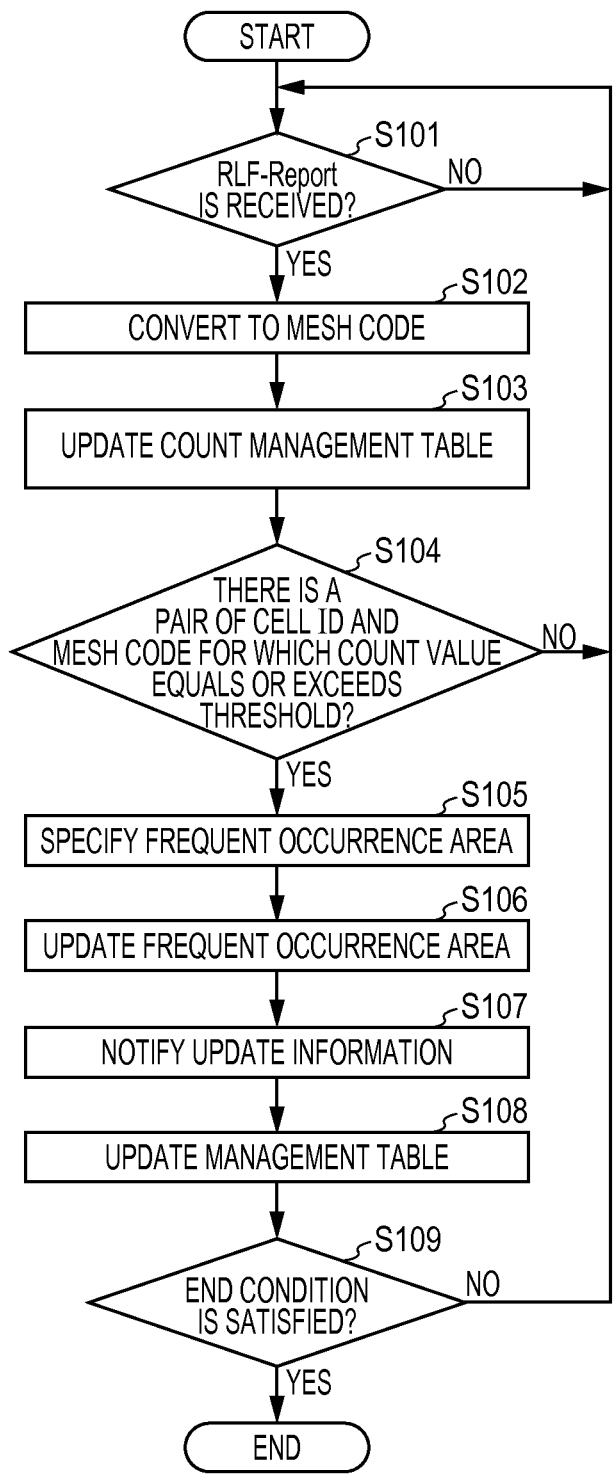
FIG. 6 is a diagram illustrating an example of an operational flowchart for specifying a frequent occurrence area, according to a first embodiment.

FIG. 6 is a diagram illustrating an example of an operational flowchart, performed by a base station, for specifying a frequent occurrence area, according to a first embodiment.

In the base station 10, the area specifying unit 13 repeatedly determines whether or not the RLF-Report has been received (No in Step S101).

In this case, when the terminal 50 is connected to cells belonging to the same base station 10 before and after communication is disconnected, the base station 10 directly obtains the RLF-Report included in the above-described terminal information response (UE information Response) from the terminal 50. FIG. 7 is a diagram illustrating an example of a terminal information response, according to an embodiment. As illustrated in FIG. 7, the RLF-Report includes the ID of a cell in which an RLF has occurred and information measured last before the RLF has occurred. Also, the information measured last before the RLF has occurred includes the measurement time, longitude, latitude, altitude, bearing, and speed.

On the other hand, when the terminal 50 connects cells belonging to different base stations 10 before and after communication is disconnected, the base station 10 is notified of the RLF-Report, via the adjacent base station 10 which is a reconnection destination, by using RLF INDICATION.

When the RLF-Report is received (Yes in Step S101), the area specifying unit 13 converts the positional information (that is, the longitude and the latitude) included in the RLF-Report into a mesh code (Step S102).

For example, the mesh code in a unit of 50 meters is calculated by following procedures (1) to (13).

(1) Convert each of the latitude and the longitude into a value in a unit of second. For example, when the longitude is represented by a three-digit value, delete the uppermost digit in advance.

(2) Determine an integer value of two digits of the value that is obtained by dividing the latitude as a result of (1) by 2400 seconds (that is, 40 minutes) to be the latitude AA of a primary mesh (80 km).

(3) Determine an integer value of two digits of the value that is obtained by dividing the longitude as a result of (1) by 3600 seconds (that is, 1 hour) to be the longitude aa of the primary mesh (80 km).

(4) Determine an integer value of the value that is obtained by dividing the reminder of the result (the latitude) of (2) by 300 seconds (that is, 5 minutes) to be the latitude B of a secondary mesh (10 km).

(5) Determine an integer value of the value that is obtained by dividing the reminder of the result (the longitude) of (3) by 450 seconds (that is, 7 minutes 30 seconds) to be the longitude b of the secondary mesh (10 km).

(6) Determine an integer value of the value that is obtained by dividing the reminder of the result (the latitude) of (4) by 30 seconds to be the latitude C of a tertiary mesh (1 km).

(7) Determine an integer value of the value that is obtained by dividing the reminder of the result (the longitude) of (5) by 45 seconds to be the longitude c of the tertiary mesh (1 km).

(8) Temporarily determine an integer value of the value that is obtained by dividing the reminder of the result (the latitude) of (6) by 15 seconds to be DA.

(9) Temporarily determine an integer value of the value that is obtained by dividing the reminder of the result (the longitude) of (7) by 22.5 seconds to be da.

(10) When the combination of DA and da is 00, determine 1 to be D that corresponds to a ½ regional mesh (500 m); when the combination is 10, determine 3 to be the D; and when the combination is 11, determine 4 to be the D.

(11) Determine an integer value of the value that is obtained by dividing the reminder of the result (the latitude) of (8) by 1.5 seconds to be the latitude E of the 50 m mesh.

(12) Determine an integer value of the value that is obtained by dividing the reminder of the result (the longitude) of (9) by 2.25 seconds to be the longitude e of the 50 m mesh.

(13) Using the above-described procedures, determine AAaaBbCcDEe to be the 50 m mesh code.

In accordance with the above-described procedures, the 50 m mesh code of "the latitude=34.123 and the longitude=133.567" is determined to be "51331445357". In the above-described example, the 50 m mesh is calculated but, using the same logic, a 5 m mesh code, a 10 m mesh code, and a mesh code of any scale may also be calculated.

Subsequently, the area specifying unit 13 updates the count management table stored in the storage unit 15 (Step S103). That is, in the count management table, the area specifying unit 13 increments the count value corresponding to a pair of the cell ID included in the RLF-Report and the mesh code calculated in Step S102.

The area specifying unit 13 determines whether or not there is a pair of the cell ID and the mesh code for which the count value exceeds a threshold (Step S104).

When there is the pair (Yes in Step S104), the area specifying unit 13 specifies the frequent occurrence area (Step S105).

FIG. 8 is a schematic diagram illustrating an example of processing for specifying a frequent occurrence area, according to an embodiment. In FIG. 8, each box corresponds to each mesh code and the number given in each box is a count value of each mesh code. The map of FIG. 8 corresponds to a single frequency. As illustrated in FIG. 8, the area specifying unit 13 groups a plurality of mesh codes for which the number of times of occurrence of disconnection (the count value) is equal to or more than the threshold and whose corresponding areas form a continuous area, into the same group. Then, the area specifying unit 13 determines a minimum rectangular area including all of areas corresponding to the mesh codes included in the same group, to be a frequent occurrence area.

Returning to FIG. 6, the area specifying unit 13 updates the frequent occurrence area table (Step S106). That is, the area specifying unit 13 reflects the frequent occurrence area specified in Step S105 to the frequent occurrence area table.

The area specifying unit 13 notifies the adjacent base station 10 of the updated frequent occurrence area table (Steps S107). Note that the area specifying unit 13 may notify the adjacent base station 10 of the entire frequent occurrence area table or only a difference from the frequent occurrence area table at the previous notification.

The area specifying unit 13 updates the management table, on the basis of the updated frequent occurrence area table and the frequent occurrence area table of the adjacent base station 10 of which the area specifying unit 13 is notified from the adjacent base station 10 (Step S108).

Figure 9:
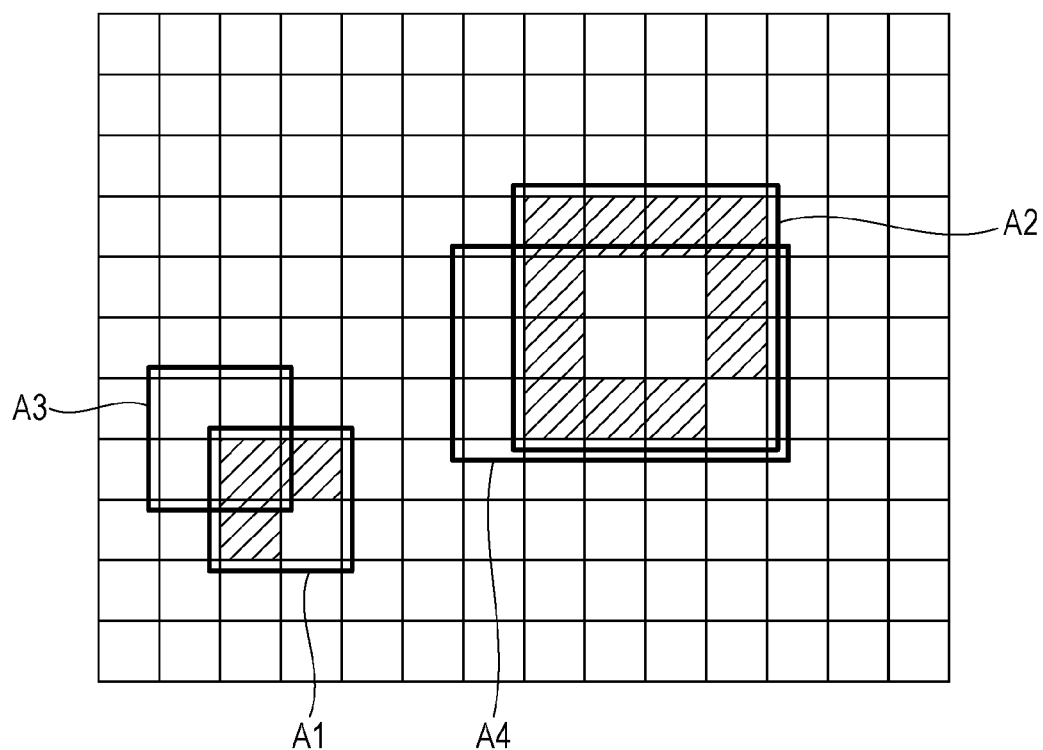
FIG. 9 is a schematic diagram illustrating an example of processing for updating a management table, according to an embodiment.

FIG. 9 is a schematic diagram illustrating an example of processing for updating a management table, according to an embodiment. In FIG. 9, an area A1 and an area A2 are frequent occurrence areas of the base station 10. On the other hand, an area A3 and an area A4 are frequent occurrence areas of the adjacent base station 10. The map of FIG. 9 corresponds to a single frequency. For example, the area specifying unit 13 stores, in the management table, information on a cell corresponding to a frequent occurrence area of the adjacent base station 10 whose 70% of the entire part overlaps a frequent occurrence area of the own base station 10 to which the area specifying unit 13 belongs, in association with the identification information of the frequent occurrence area of the base station 10 and the cell ID corresponding to the identification information. In FIG. 9, 70% or more of the area A2 overlaps the area A4, and thus, a cell corresponding to the area A4 is stored in the management table.

Then, when an end condition is satisfied (Yes in Step S109), the processing for specifying an frequent occurrence area is ended. Note that, when there is no pairs (No in Step S104) or when the end condition is not satisfied (No in Step S109), the process returns to Step S101.

Note that there might be cases where, even in an area which has been once determined to be the frequent occurrence area, the occurrence frequency of the RLF reduces because of change of the propagation environment. Therefore, the area specifying unit 13 performs processing for reducing the count value of the count management table per predetermined time. For example, when the count value is fixed to the same value as the threshold at the time when the count value reaches the threshold, the area specifying unit 13 may multiply each of all of the count values by a number which is greater than 0 and smaller than 1 (for example, 0.7), and alternatively, may subtract a predetermined value from each of all of the count values. As described above, using the count management table in which all of the count values are less than the threshold, the frequent occurrence area table and the management table are updated. Thus, an area whose propagation environment has been improved may be excluded from the frequent occurrence area.

Handover Control Processing

Figure 10:
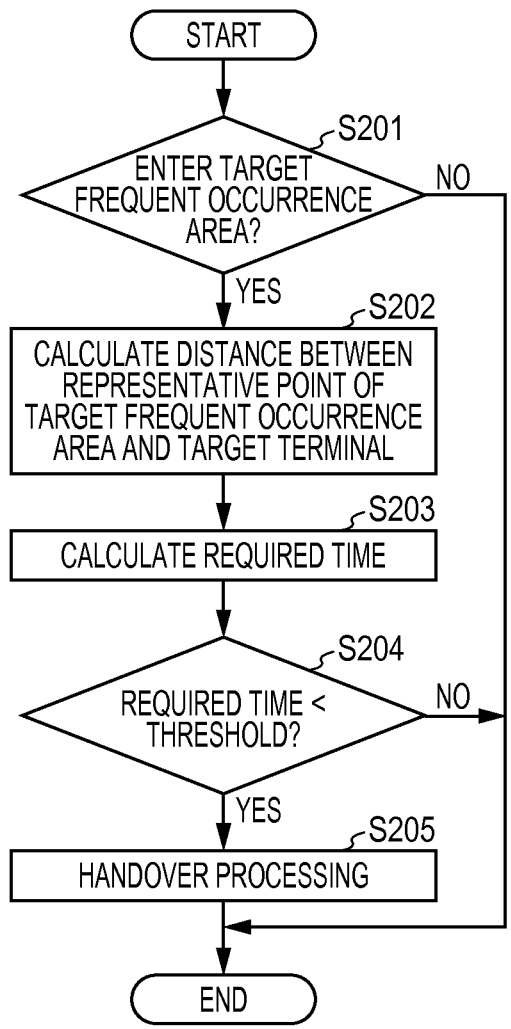
FIG. 10 is a diagram illustrating an example of an operational flowchart for handover control, according to an embodiment.

FIG. 10 is a diagram illustrating an example of an operational flowchart for handover control, according to an embodiment.

First, one frequent occurrence area corresponding to the cell with which the target terminal 50 connects is selected.

Then, the handover control unit 14 determines whether or not the target terminal 50 enters the target frequent occurrence area (Step S201). For example, when a straight line extending from the current position of the target terminal 50 in the moving direction intersects with the target frequent occurrence area, the handover control unit 14 determines that the target terminal 50 is expected to enter the target frequent occurrence area.

When it is determined that the target terminal 50 is expected to enter the target frequent occurrence area (Yes in Step S201), the handover control unit 14 calculates a distance between a representative point of the target frequent occurrence area and the target terminal 50 (Step S202). As the representative point, a point closest to the target terminal 50 in the frequent occurrence area may be used, and alternatively, a point at which the target terminal 50 is estimated to enter may be used. The point at which the target terminal 50 is estimated to enter is a point at which the straight line extending from the current position of the target terminal 50 in the moving direction first intersects with the target frequent occurrence area.

The handover control unit 14 calculates time needed for the target terminal 50 to enter the target frequent occurrence area, that is, a required time by dividing the distance calculated in Step S202 by the moving speed of the target terminal 50 (Step S203).

The handover control unit 14 determines whether or not the required time calculated in Step S203 is less than a threshold (Step S204).

When it is determined that the required time is less than the threshold (Yes in Step S204), it is determined that the target terminal 50 immediately enters the frequent occurrence area, and thus, the handover control unit 14 performs handover control on the target terminal 50 (Step S205).

For example, the handover control unit 14 forcibly causes handover of the target terminal 50 to a cell which includes neither a frequent occurrence area of the own base station 10 to which the handover control unit 14 belongs nor a frequent occurrence area of the adjoining base station 10.

For example, assume that it is determined that the target terminal 50 connecting with the cell whose cell ID is 1 is expected to enter the frequent occurrence area whose group ID is 1 within a short period of time. In this case, the base station 10 forcibly causes handover of the target terminal 50 to another cell. Note that there is a probability that the same region is in the frequent occurrence area also in another cell, and, in that case, the RLF occurs even if the handover is performed. In order to avoid such a case, the handover control unit 14 confirms that a frequent occurrence area corresponding to the pair of (the cell ID, the group ID)=(1, 1) is not a frequent occurrence area in the handover destination cell by referring to the management table. That is, in the management table of FIG. 4, the cells (that is, the cell IDs=7, 8, 9, 10) held as the cells corresponding to the pair of (the cell ID, the group ID)=(1, 1) are registered as black cells, and handover to a cell other than the black cells is performed. Thus, it may be possible to avoid the occurrence of the RLF and the execution of a subsequent reconnection sequence.

Note that, when it is determined that the target terminal 50 does not enter the target frequent occurrence area (No in Step S201) or when it is determined that the required time is equal to or more than the threshold (No in Step S204), the processing flow ends.

The foregoing handover control processing is performed for each of the frequent occurrence areas by sequentially changing a frequent occurrence area to be processed. Also, the foregoing handover control processing is performed for each of the target terminals 50 by sequentially changing a target terminal to be processed.

Now, a method for calculating the positional relationship between a target terminal 50 and a frequent occurrence area will be described.

The mesh code is calculated in accordance with a certain logic, and therefore, the positional relationship between the position of a target terminal 50 and a frequent occurrence area may be calculated in a simple manner. For example, the positional relationship between the current position P101 of the target terminal 50 illustrated in FIG. 11 and the box located in the northeast in the frequent occurrence area A201 may be calculated as illustrated in FIG. 12. Note that, in FIG. 11, the upper direction corresponds to the true north.

A difference between the mesh code corresponding to the current position P101 and the mesh code corresponding to the box located in the northeast in the frequent occurrence area A201 is calculated as follows.

(0,−1)×20+(+1,0)×20+(−1,+1)×10+(0,+5)+(−7,0)=(+3,−5)

That is, when viewed from the current position P101, the box located in the northeast in the frequent occurrence area A201 is in a position three cells away to the east and five cells away to the south.

The base station 10 which has received MeasurementReport from the terminal 50 obtains the positional relationship between each of the boxes located in northwest, northeast, southwest, and southeast of each frequent occurrence area, and the target terminal 50. On the basis of the result, the base station 10 obtains the distance between the target terminal 50 and each box, and obtains the bearing (assuming herein that the true north is 0 degrees) of each box viewed from the target terminal 50. The calculation results obtained in the above-described manner are illustrated in FIG. 13.

Processing for Setting Report Cycle

In the base station 10, the handover control unit 14 sets, for each of the terminals 50 connected to the cells registered in the frequent occurrence area table, a report cycle that is most frequent among the report cycles of MeasurementReport, at the time when RRC Connection is established, and furthermore, sets MeasurementReport so that the MeasurementReport includes locationInfo. That is, at the time of RRC Connection Reconfiguration, ReportInterval=120 ms, reportAmount >1, triggerType=periodical, includeLocationInfo=true are specified. Thus, the base station 10 recognizes the position, speed, and bearing of the terminal 50 in detail.

As described above, according to this embodiment, in the base station 10, the handover control unit 14 controls handover so as to change the current cell of the target terminal 50 to anther cell, on the basis of the frequent occurrence area specified for each cell by the area specifying unit 13, the current cell of the target terminal 50, the position, moving speed, and moving direction of the target terminal 50.

For example, when it is determined that the target terminal 50 is expected to enter the frequent occurrence area specified by the area specifying unit 13 and the time needed for the target terminal 50 to enter the frequent occurrence area is less than the threshold, the handover control unit 14 forcibly causes handover of the target terminal 50.

Thus, the terminal 50 that is expected to immediately enter the frequent occurrence area may be handed over in advance, so that the RLF may be avoided in advance and the execution of a reconnection sequence may be avoided. As a result, the usability for a user may be improved and increase in amount of signaling may be reduced.

The handover control unit 14 counts the number of times of occurrence of disconnection of communication (the count value) for each mesh code, on the basis of the RLF-Report, and determines an area corresponding to the mesh code for which the count value is more than the threshold, to be a frequent occurrence area.

Thus, an area which has a high frequency of occurrence of the RLF may be set as a frequent occurrence area for each of mesh codes.

The handover control unit 14 groups a plurality of mesh codes for which the count value is equal to or more than the threshold and whose corresponding areas form a continuous area, into the same group.

Thus, processing may be performed in a unit of group so that the processing is simplified.

The handover control unit 14 determines the rectangular area including all of areas corresponding to mesh codes included in the same group to be a frequent occurrence area.

Thus, the frequent occurrence area may be handled as the rectangular area so that the processing is further simplified.

The handover control unit 14 causes handover of the target terminal 50 to a cell which includes neither the frequent occurrence areas of the own base station 10 to which the handover control unit 14 belongs nor the frequent occurrence areas of the adjacent base station 10.

Thus, a cell which does not include frequent occurrence areas may be set as a handover destination cell so that the occurrence of the RLF is more reliably reduced.

The handover control unit 14 sets a cycle of MeasurementReport transmitted by the terminal 50 which connects with a cell including a frequent occurrence area of the own base station 10 to which the handover control unit 14 belongs, at a value shorter than a cycle of MeasurementReport transmitted by the terminal 50 which does not connect with a cell including a frequent occurrence area of the own base station 10.

Thus, a position and the like of the terminal 50 for which forcible handover is highly likely to be executed may be more accurately comprehended. As a result, the terminal 50 in which the RLF is highly likely to occur may be more reliably determined as a target of forcible handover.

Second Embodiment

A second embodiment relates to limitation of forcible handover.

Figure 14:
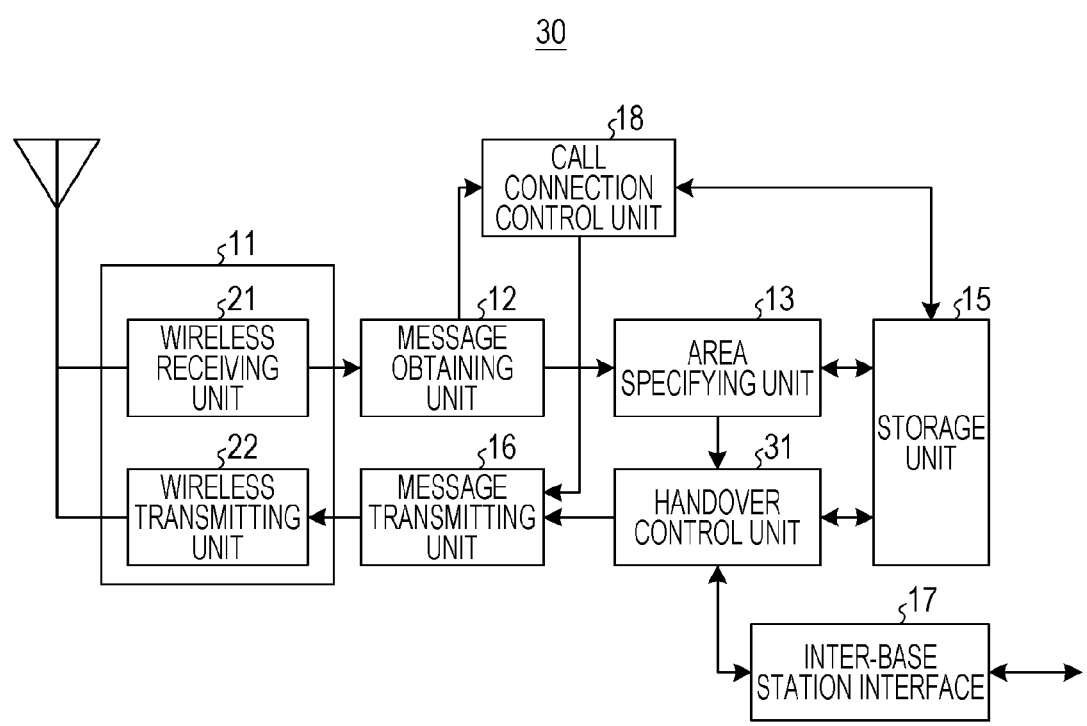
FIG. 14 is a diagram illustrating an example of a configuration of a base station, according to a second embodiment.

FIG. 14 is a diagram illustrating an example of a configuration of a base station, according to a second embodiment. In FIG. 14, a base station 30 includes a handover control unit 31.

The handover control unit 31 excludes, from targets of forcible handover, a terminal 50 for which it is determined that a time needed to pass through the frequent occurrence area is short.

Specifically, the handover control unit 31 determines whether or not the target terminal 50 enters a target frequent occurrence area, on the basis of a target frequent occurrence area whose frequency is the same as that of the current cell of the target terminal, among the frequent occurrence areas specified by the area specifying unit 13, and the position and the moving direction of the target terminal 50.

Then, the handover control unit 31 calculates, on the basis of the target frequent occurrence area and the moving speed of the target terminal 50, time needed for the target terminal 50 to pass through the target frequent occurrence area.

When it is determined that the target terminal 50 enters the target frequent occurrence area and the calculated time is less than a threshold, the handover control unit 31 excludes the target terminal 50 from targets of forcible handover.

As described above, according to the embodiment, when it is determined that the target terminal 50 enters the target frequent occurrence area and the calculated time is less than the threshold, in the base station 30, the handover control unit 31 excludes the target terminal 50 from targets of forcible handover.

Thus, the terminal 50 that has a low chance of causing the RLF even when the terminal 50 enters a frequent occurrence area may be in advance excluded from targets of forcible handover, thereby avoiding unnecessary processing for handover.

Other Embodiments

The base stations and the terminals of the first embodiment and the second embodiment may be realized by the following hardware configuration.

Figure 15:
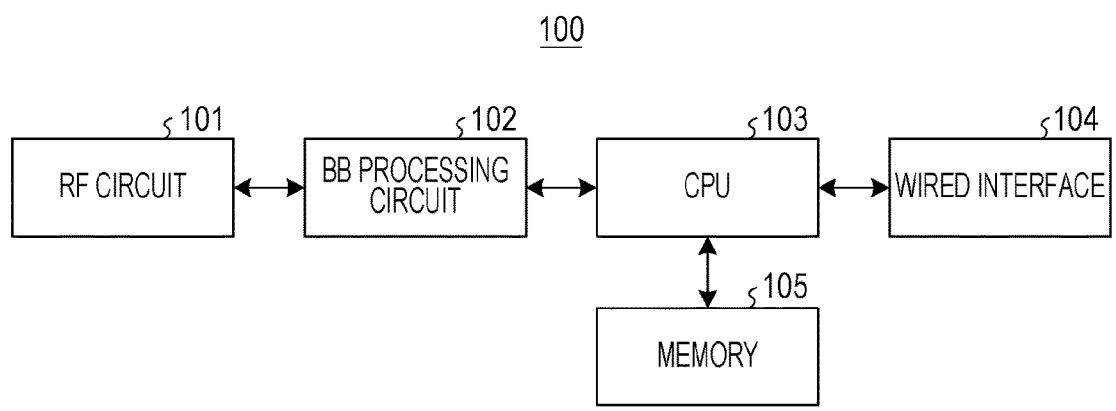
FIG. 15 is a diagram illustrating an example of a hardware configuration of a base station, according to an embodiment.

FIG. 15 is a diagram illustrating an example of a hardware configuration of a base station, according to an embodiment. As illustrated in FIG. 15, a base station 100 includes, as components of a hardware, a radio frequency (RF) circuit 101, a base band (BB) processing circuit 102, a central processing unit (CPU) 103, a wired interface 104, and a memory 105. The memory 105 includes, for example, a RAM, such as a synchronous dynamic random access memory (SDRAM), a read only memory (ROM), and a flash memory. The area specifying unit 13, the handover control units 14 and 31, the call connection control unit 18, the message obtaining unit 12, and the message transmitting unit 16 are realized by an integrated circuit, such as the CPU 103. Also, the communication unit 11 is realized by the RF circuit 101.

Figure 16:
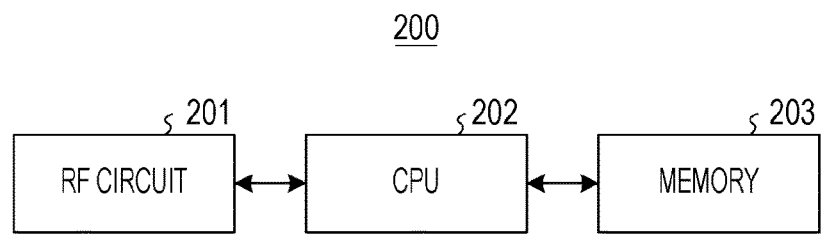
FIG. 16 is a diagram illustrating an example of a hardware configuration of a terminal, according to an embodiment.

FIG. 16 is a diagram illustrating an example of a hardware configuration of a terminal, according to an embodiment. As illustrated in FIG. 16, in view of hardware, the terminal 50 includes a radio frequency (RF) circuit 201, a central processing unit (CPU) 202, and a memory 203. The memory 203 includes, for example, a RAM, such as a synchronous dynamic random access memory (SDRAM), a read only memory (ROM), and a flash memory. The message receiving unit 52, the control unit 53, and the message transmitting unit 55 are realized by an integrated circuit, such as the CPU 202. The communication unit 51 is realized by the RF circuit 201.

Moreover, various types of processing described in the first embodiment and the second embodiment are realized by causing a computer to execute a program prepared in advance. That is, a program corresponding to each processing executed by the area specifying unit 13, the handover control units 14 and 31, the call connection control unit 18, the message obtaining unit 12, and the message transmitting unit 16 may be recorded in the memory 105, and each program may be read out by the CPU 103 to function as a process. Also, a program corresponding to each processing executed by the message receiving unit 52, the control unit 53, and the message transmitting unit 55 may be recorded in the memory 203, and each program may be read out by the CPU 202 to function as a process.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station comprising:
    a processor configured to:
        perform communication with a terminal by a cell, the cell being a combination of a frequency and a divided area obtained by dividing an area reachable by a signal transmitted from the base station,
        specify a first area of the base station reachable by the signal transmitted from the base station in which disconnection of communication with a terminal occurs more frequently as compared to another area of the base station, and
        control handover that changes a current cell of a first terminal to another cell other than the specified first area of the base station and a specified first area of an adjacent base station based on a management table associating a cell ID and a group ID of the specified first area of the base station and a cell ID of the adjacent base station, information of the current cell of the first terminal, and a position, moving speed, and moving direction of the first terminal; and
    a memory configured to store information on areas and the cells, wherein
    the processor obtains a first report transmitted from each of terminals each time communication for the each terminal is disconnected, the first report including positional information of the each terminal at a time when the communication is disconnected;
    the processor counts, based on the obtained first report, a count value defined as a number of times the communication is disconnected, for each mesh code, and sets, as the first area, an area corresponding to a mesh code for which the count value is equal to or greater than a second threshold; and
    the processor groups a plurality of mesh codes for which the count value is equal to or greater than the second threshold and whose corresponding areas form a continuous area, into a same group.

2. The base station of claim 1, wherein
    the processor determines whether or not the first terminal is expected to enter one of the specified first areas that corresponds to a cell having a frequency equal to that of the current cell of the first terminal, based on information on the one of the first areas and the position and moving direction of the first terminal;
    the processor calculates a time needed for the first terminal to enter the one of the first areas, based on information on the one of the first areas and the position and moving speed of the first terminal; and
    the processor causes the first terminal to perform handover thereof when it is determined that the first terminal is expected to enter the one of the first areas and the calculated time is less than a first threshold.

3. The base station of claim 1, wherein
    the processor sets, as the first area, a rectangular area including all of areas corresponding to mesh codes included in the same group.

4. The base station of claim 2, wherein
    the processor cyclically obtains, from each terminal included in an area of the base station, a second report including a position, moving speed, and a moving direction of the each terminal; and
    when a transmission source terminal that has issued the obtained second report is connected to a cell including the first area of the base station, the processor determines whether the transmission source terminal is expected to enter the first area of the base station.

5. The base station of claim 4, wherein
    the processor sets a cycle of the second report transmitted by the transmission source terminal connected to the cell including the first area of the base station, at a value shorter than a cycle of the second report transmitted by the transmission source terminal that is not connected to the cell including the first area of the base station.

6. The base station of claim 1, wherein
the processor determines whether the first terminal is expected to enter the first area, based on information on one of the first areas whose frequency is equal to that of the current cell of the first terminal, and the position and moving direction of the first terminal;
the processor calculates, based on the position and moving speed of the first terminal, a time needed for the first terminal to pass through the first area; and
the processor excludes the first terminal from targets of handover when it is determined that the first terminal is expected to enter the first area and the calculated time is less than a second threshold.

7. A handover control method comprising:
specifying a first area of a base station reachable by a signal transmitted from the base station in which disconnection of communication with a terminal occurs more frequently as compared to another area of the base station, a cell being a combination of a frequency and a divided area obtained by dividing an area reachable by the signal transmitted from the base station;
controlling handover that changes a current cell of a first terminal to another cell other than the specified first area of the base station and a specified first area of an adjacent base station based on a management table associating a cell ID and a group ID of the specified first area of the base station and a cell ID of the adjacent base station, information of the current cell of the first terminal, and a position, moving speed, and moving direction of the first terminal;
obtaining a first report transmitted from each of terminals each time communication for the each terminal is disconnected, the first report including positional information of the each terminal at a time when the communication is disconnected;
counting, based on the obtained first report, a count value defined as a number of times the communication is disconnected, for each mesh code, and sets, as the first area, an area corresponding to a mesh code for which the count value is equal to or greater than a second threshold; and
grouping a plurality of mesh codes for which the count value is equal to or greater than the second threshold and whose corresponding areas form a continuous area, into a same group.

\* \* \* \* \*